United States Patent [19]

Pauluk et al.

[11] Patent Number: 4,615,719
[45] Date of Patent: Oct. 7, 1986

[54] STATION INDICATOR

[75] Inventors: Harry J. Pauluk, Ocean City; Otto Zauner, Vineland, both of N.J.

[73] Assignee: Owens-Illinois, Inc., Toledo, Ohio

[21] Appl. No.: 650,595

[22] Filed: Sep. 14, 1984

Related U.S. Application Data

[60] Division of Ser. No. 457,346, Jan. 12, 1983, Pat. No. 4,477,275, which is a continuation of Ser. No. 239,949, Mar. 3, 1981, abandoned.

[51] Int. Cl.⁴ .................... C03B 19/00; C03B 35/26; C03B 35/00
[52] U.S. Cl. .......................................... 65/29; 65/102; 198/341
[58] Field of Search .................. 198/341, 340; 65/29, 65/102, 111, 64, 158, 243, 165; 264/40.1; 425/169; 73/432 R; 209/522; 29/705, 407; 10/2; 414/222

[56] References Cited

U.S. PATENT DOCUMENTS

| | | | |
|---|---|---|---|
| 2,700,154 | 1/1955 | Dilts | 65/158 X |
| 2,849,114 | 8/1958 | Noble et al. | 65/158 X |
| 3,268,318 | 8/1966 | Murley | 65/158 |
| 3,836,614 | 9/1974 | Neugroschl | 264/40.1 |
| 4,062,914 | 12/1977 | Hinzpeter | 264/40.1 |
| 4,069,716 | 1/1978 | Vanasco et al. | 73/432 R |
| 4,157,206 | 6/1979 | Ikeda et al. | 198/341 X |
| 4,266,961 | 5/1981 | Wood | 65/158 |
| 4,270,649 | 6/1981 | Mayer | 198/341 |

Primary Examiner—Kenneth M. Schor
Attorney, Agent, or Firm—John R. Nelson

[57] ABSTRACT

A device for use with machines having plural article fabrication or tooling stations and an exit path remote from the stations indicates the specific fabrication or tooling station upon which a given individual article was formed. The device includes a display device having indicia such as numerals which correspond to the plural stations and drive means which causes a specific indicia to be displayed as an article from the corresponding remote tooling station traverses a given reference location along the exit path. The device expedites rapid tracing or malfunctions to specific ones of the plural forming stations.

5 Claims, 4 Drawing Figures

STATION INDICATOR

This is a Division, of application Ser. No. 457,346 filed Jan. 12, 1983 now U.S. Pat. No. 4,477,275, which in turn is a continuation of application Ser. No. 239,949 filed Mar. 3, 1981, now abandoned.

BACKGROUND OF THE INVENTION

This invention relates generally to indicating devices and more specifically to such devices which indicate which specific station of a machine having plural fabrication or tooling stations formed a given article.

High speed production equipment is utilized in many industries to manufacture unitary products such as containers like glass vials and lightbulb envelopes, screws and threaded fasteners, and other component parts. Many machines which fabricate these parts utilize fabrication or tooling stations which progressively form such unitary parts from metal, plastic, or glass stock. A machine which accomplishes the transformation of material stock into a finished article is understandably complex. Such a machine will typically include a plurality of fabrication or tooling stations remote from the location at which completed articles exit the machine. Such separation renders the detection and tracing of malfunctioning forming stations difficult inasmuch as no apparent relationship generally exists between a particular article departing from the machine and the particular one of a plurality of identical moving or cycling forming stations which formed the article. In such instances, correction of the malfunction may typically be achieved only by shutting down the machine and inspecting several or all of the forming stations or on a trial and error basis. Furthermore, since the production speed of such machines may vary depending upon the particular products being formed or other considerations, mental counting procedures or timing devices external to the machine itself will result in an accurate indication only under given conditions.

As a specific example, small glass containers such as vials may be formed in machines known in the art as vertical vial machines. Such machines accept glass tube stock in plural rotating chucks. The rotating chucks are disposed about the periphery of a revolving carousel having a plurality of stationary heating and forming stations which transform the glass stock into vials. Such machines may also incorporate ware finish tooling stations which circulate in closed paths substantially outside the periphery of, but partially coincident with the path of travel of the machine chucks. The completed article is discharged from the machine at a location remote from the circulating tooling station which provided the vial finish and it is difficult, if not impossible, to accurately determine which of the tooling stations formed a given glass vial finish.

Trial and error correction of the malfunctioning or misadjusted tooling station will often result in the misadjustment of a properly operating tooling station. Alternatively, the machine may be shut down, and each of the tooling stations may be inspected or operated through one cycle to visually locate the malfunction. These approaches, of course, seriously reduce production and increase downtime; both factors resulting in increased production costs.

SUMMARY OF THE INVENTION

The invention is directed to a forming station indicating device which displays an identifying indicia corresponding to the one of a plurality of fabricating or tooling stations which formed a given individual article. The indicating device is located at a reference location, for example, adjacent the exit path of the articles from the machine such that an operator can simultaneously view both the exiting articles and the indicator display. The display may be driven by means such as the machine drive, which is directly related to the machine speed, such that the display is accurate for all machine speeds and production conditions. Preferably, the station indicator comprises a wheel having a plurality of indicia such as numerals disposed about its periphery. Each of the numerals corresponds to one of the forming or tooling stations. The wheel is preferably driven by the same drive means which drives the forming stations. The station indicator is located adjacent the exit path of the products from the machine and rotates to display the number of a forming station as an article formed by that forming station passes a reference location along the exit path from the machine. It should be appreciated that various electric and electronic synchronized indication means which achieve this result are deemed to be obvious variations of it and therefore, to be within the scope of this invention. For example, position or rotation sensors on the forming station drive means may be utilized to provide a pulsed signal to a suitable counter which steps and displays appropriate indicia in proper phase with the output of the machine, so as to indicate the station in which a given article was formed or tooled in accordance with the intent and purpose of the instant invention.

Thus, it is an object of the instant invention to provide a device which indicates the specific fabrication or tooling station of a multiple station machine, upon which a given individual article was formed.

It is a further object of the instant invention to provide forming or tooling station information which is directly related to the speed of the production machine, and therefore, accurate at all speeds.

It is a still further object of the instant invention to provide forming or tooling station information directly to an operator of a multiple station machine, which does not require counting or operator interpretation.

Further objects and advantages of the instant invention will become apparent by reference to the following specification and appended drawings.

DESCRIPTION OF THE PREFERRED EMBODIMENT

Figure 1:
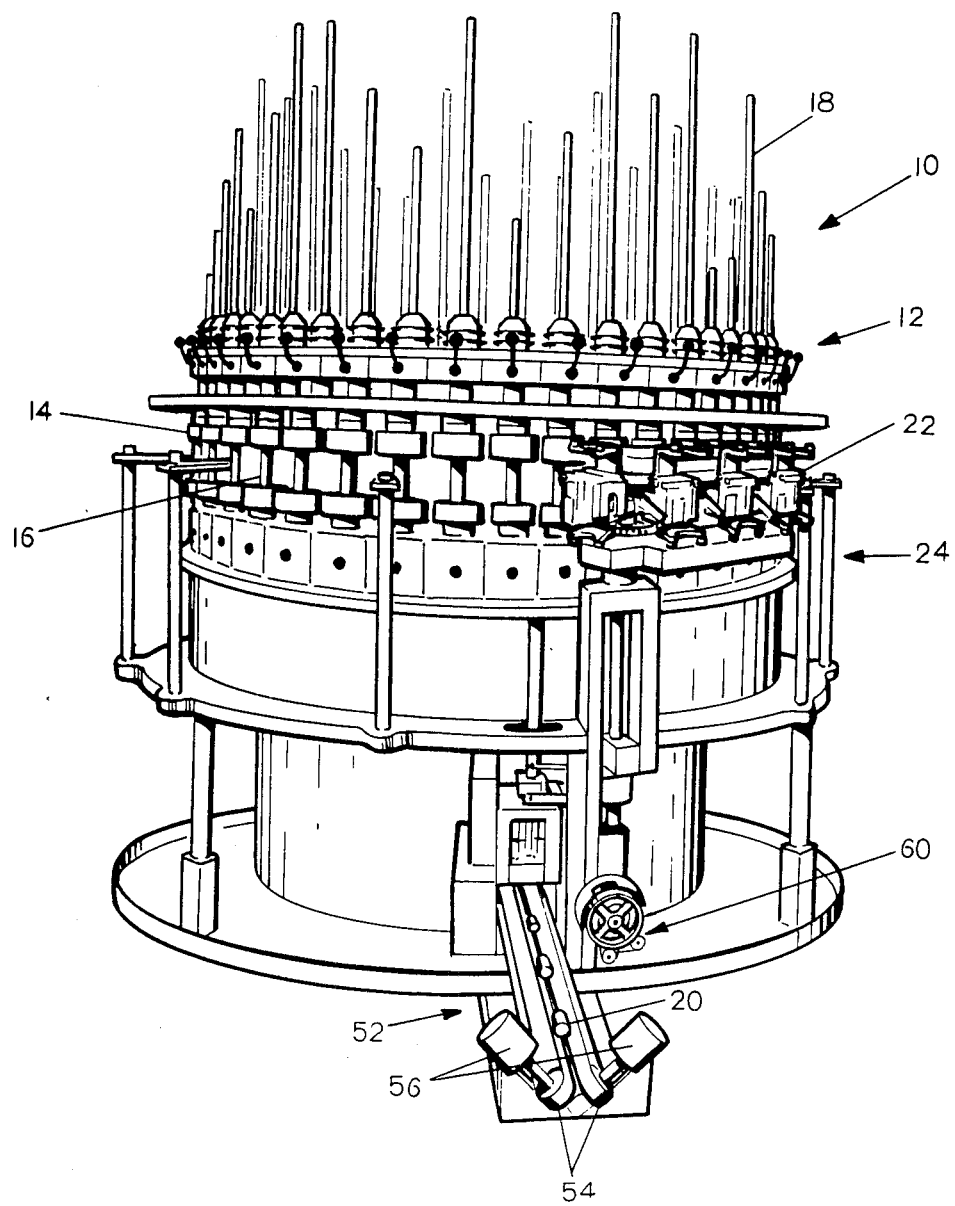
FIG. 1 is a perspective view of a vertical glass vial machine incorporating the instant invention.

Referring now to FIG. 1, a machine incorporating the instant station indicator invention is disclosed and generally designated by the reference numeral 10. The machine 10 illustrated is a vertical glass vial machine which fabricates glass vials from tubular glass stock. This specific machine 10 is illustrated by way of example only inasmuch as the instant invention will function equally well with various machines having multiple tooling stations which produce diverse products. This instant machine 10 is carousel-like in structure, having a plurality of work-supporting fixtures 12 which generally define the periphery of the machine 10 and which revolve about the central, vertical axis of the machine 10. The fixtures 12 each include an upper and a lower rotating chuck assembly 14 and 16, respectively, which rotate synchronously and which may be independently opened or closed as necessary during the production cycle to permit the feeding of new lengths of stock, such as glass tubes 18, as well as to permit the exit of articles from the machine 10, such as glass vials 20.

Again, for purposes of example, but in a fashion similar to machines in which the instant invention will find appropriate application, the vial machine 10 includes a plurality of tooling stations 22, which are disposed on and circulate about a pair of conveyor assemblies 24. Each of the tooling stations 22, includes means such as forming rollers and a mandrel (not illustrated) which cooperate to form the outer and inner surfaces of the finish of a vial 20, respectively, while the glass tube 18 is rotating in one of the upper chuck assemblies 14. The glass tube 18 now having a finish on its lower marginal edge is advanced downwardly into the vertically aligned, synchronously rotating lower chuck assembly 16. Heat is applied and the portion of the glass tube 18 having the finish on its lower margin is separated from the remaining glass tube 18; the surface tension of the heated glass creating a solid bottom on the upper end of the glass tube 18 now gripped in the lower chuck assembly 16, thereby forming a glass vial 20. Thus, the glass vial machine 10 sequentially forms the vial finish and then the end of one vial 20, each operation encompassing approximately 180° of revolution of the fixtures 12 on the machine 10.

The complete fabrication of one glass vial 20 requires substantially one complete revolution (360°) of the machine. And the forming of a vial finish in an upper chuck assembly 14 is accompanied by the forming of a vial bottom in the axially aligned lower chuck assembly 16. Inasmuch as each complete forming operation encompasses 180° of revolution of the fixtures 12, each operation can occur twice during one revolution of the fixtures 12, and, thus, substantially all heating, forming and tooling operations occur twice during one complete revolution of the fixtures 12 and the components that provide these functions are situated about the machine 10 in pairs at diametrically opposed locations.

Figure 2:
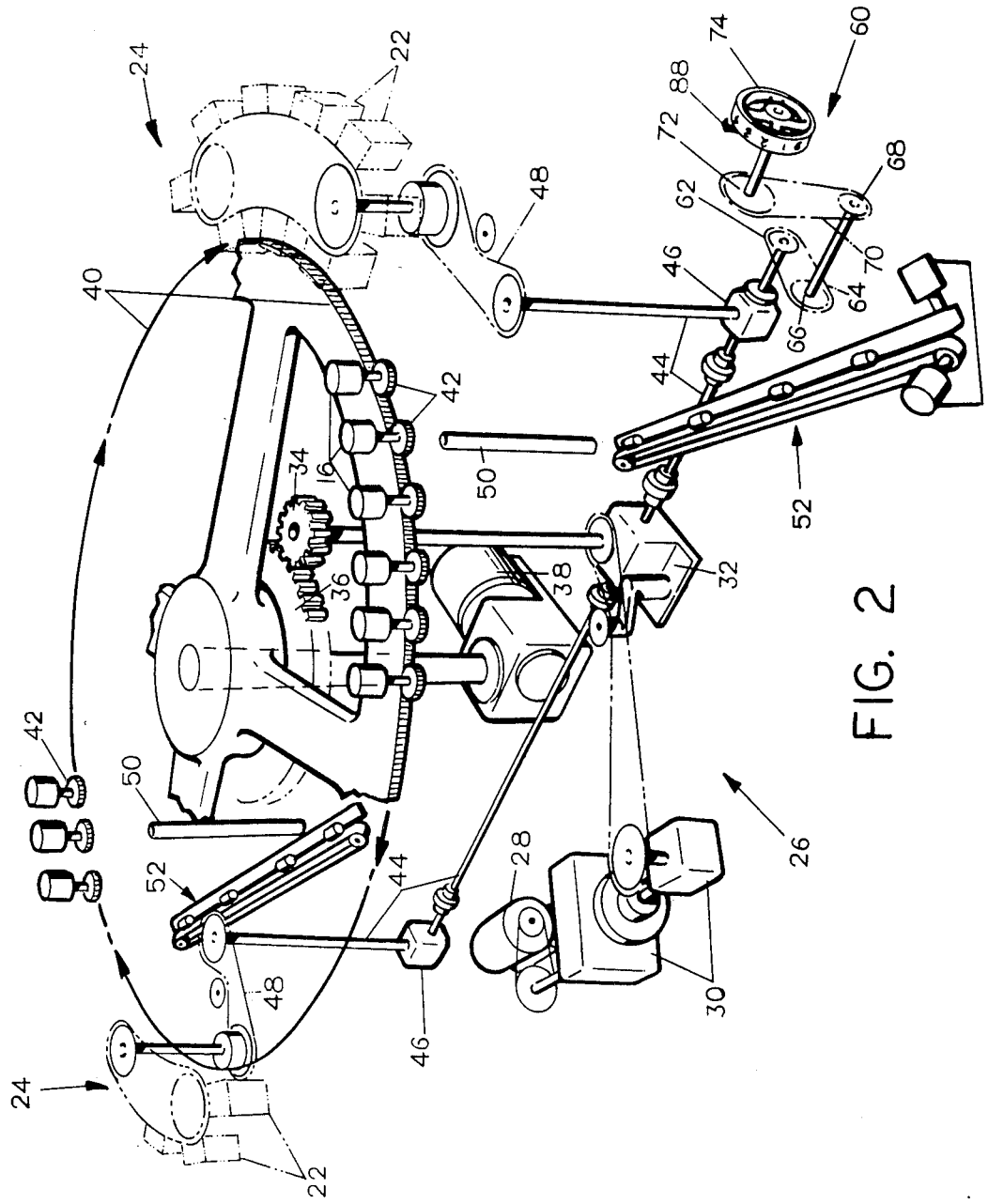
FIG. 2 is a diagrammatic perspective view of a drive mechanism of a vertical glass vial machine incorporating the instant invention.

Referring now to FIGS. 1 and 2, the machine 10 further includes a drive assembly 26 which provides and distributes energy to the revolving fixtures 12 and the conveyor assemblies 24. The drive assembly 26 includes a suitable electric motor 28 and speed reduction unit 30, which drives a power distribution means 32. The distribution means 32 drives a pinion gear 34 which in turn drives a spur gear 36. The spur gear 36 is secured to and revolves the fixtures 12 about the central vertical axis of the machine 10. A variable speed drive assembly 38 rotates an upper and a lower bull gear 40 (only the lower gear 40 being illustrated in FIG. 2) which engage and synchronously rotate a plurality of pinion gears 42 and the upper and lower chuck assemblies 14 and 16, respectively. The power distribution means 32 also provides rotary power to the conveyor assembly 24 through shafts 44, right angle drive assemblies 46 and sprocket and chain drives 48 to cause the tooling stations 22 to circulate about the conveyor assemblies 24.

The machine 10 further includes a pair of discharge assemblies comprising a chute 50 which receives and directs the articles of manufacture such as the glass vials 20 from the lower portion of the lower chuck assemblies 16 onto a radially oriented article conveyor 52. The article conveyor 52 comprises a pair of belts 54 disposed at right angles to one another and driven by a respective pair of drive means such as electric motors 56. The article conveyor 52 thus provides an exit path for the articles manufactured by the machine 10.

Figure 3:
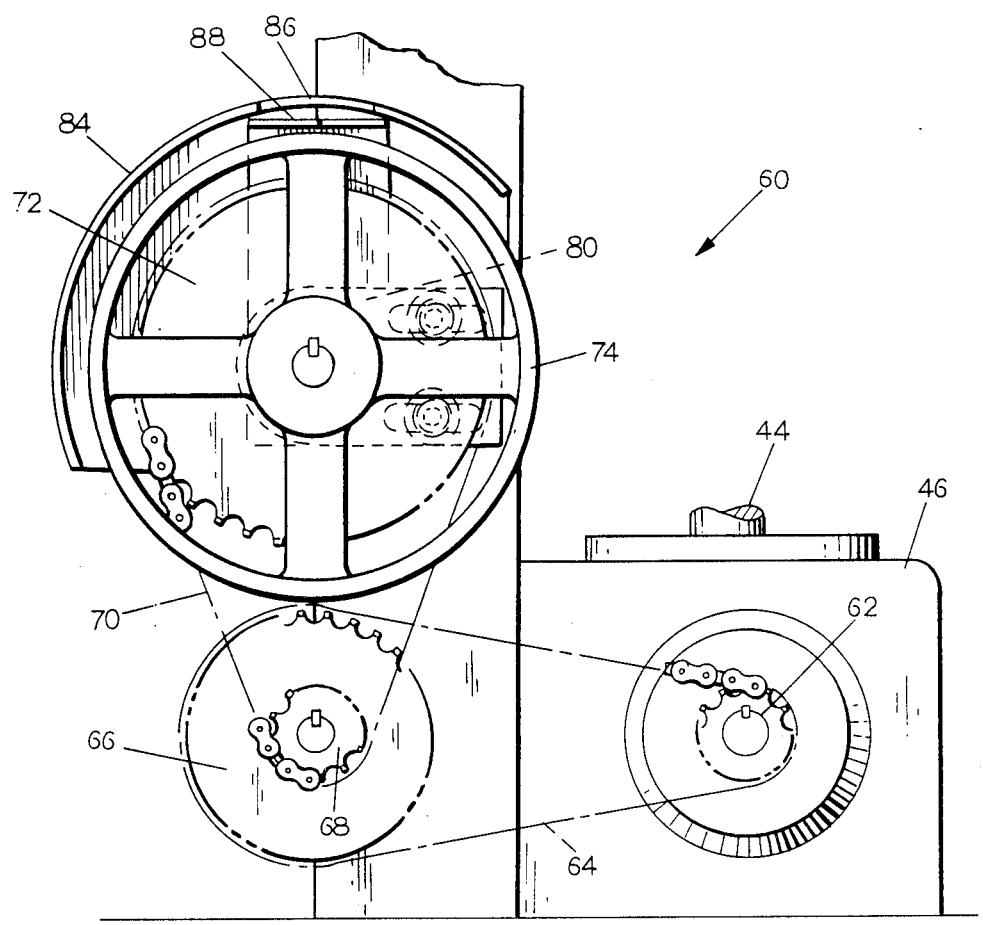
FIG. 3 is a side elevational view of a forming station indicator according to the instant invention.

Referring now to FIG. 1, and especially FIGS. 2 and 3, the machine 10 also includes a pair of station indicator assemblies 60. Each of the station indicator assemblies 60 includes a first sprocket 62 which is driven by an output means from the right angle drive assembly 46. A chain 64 is disposed about the sprocket 62 and positively drives a second sprocket 66.

Figure 4:
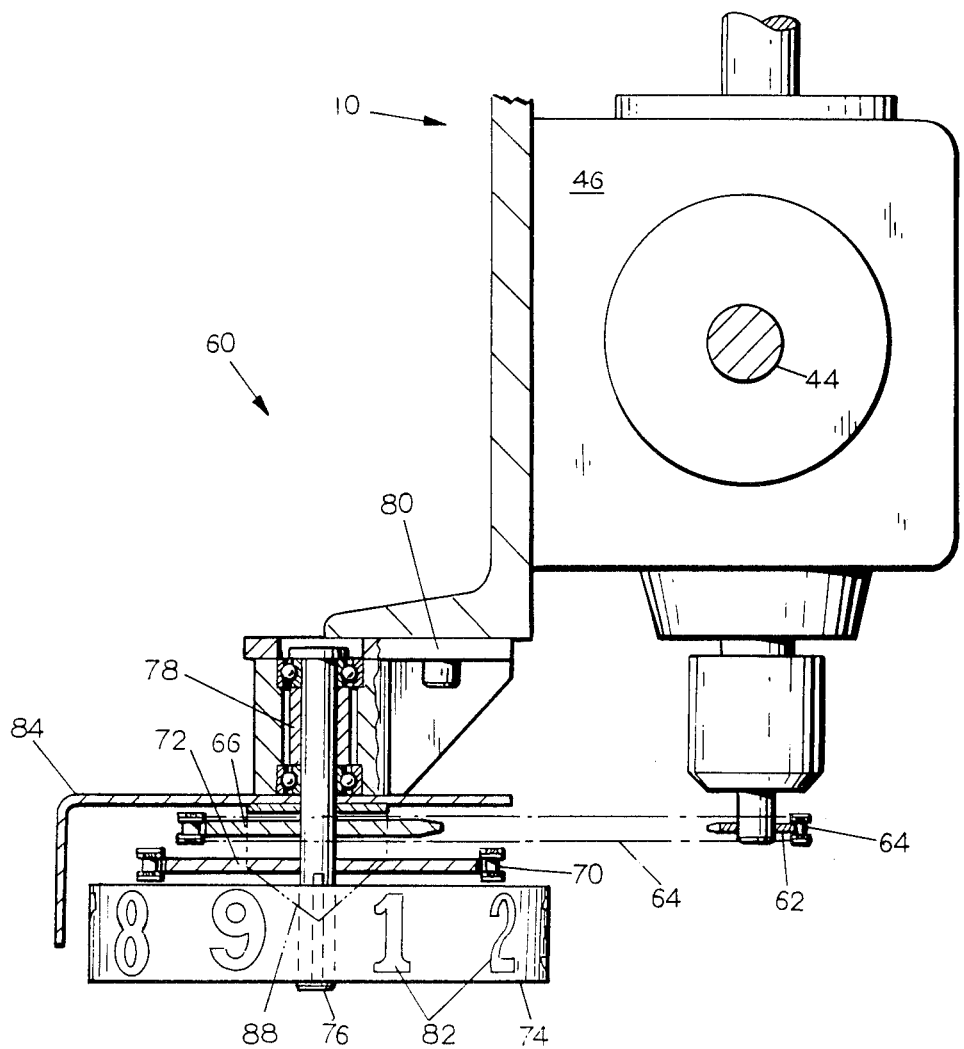
FIG. 4 is a top plan view of a forming station indicator according to the instant invention.

Referring now to FIGS. 2, 3, and 4, the second sprocket 66 is suitably mounted for rotation and includes a coaxially disposed third, inner sprocket 68 about which a chain 70 is disposed. The third sprocket 68, through the chain 70, positively drives a fourth sprocket 72, which is secured to and rotates with an indicator wheel 74. The choice of relative diameters of the sprockets 62, 66, 68 and 72 is determined by the required speed reduction through this power train. Considerations regarding this choice of diameters are addressed below. The indicator wheel 74 is fixedly secured to a shaft 76, which is in turn supported on suitable bearings 78 disposed within structural members 80 of the machine 10. On the surface of the indicator wheel 74, at equally spaced intervals, are indicia 82 corresponding to the tooling stations 22. Preferably, the wheel 74 only includes a single indicia 82 for each of the tooling stations in order that they may be as large and as easily readable as possible. It should be apparent, however, that double or triple sets of indicia 82, for example, disposed over circumferential intervals of 180° or 120°, respectively, may be utilized in certain applications if suitable reductions in drive speeds to the indicator wheel 74 are made as will be described below. The indicator wheel 74 is enclosed within a shroud 84 having a viewing window 86. The circumferential width of the viewing window 86 s slightly greater than the width of a single indicia 82. A pointer or hairline 88 may be positioned centrally within the viewing window 86 to reduce parallax error and thereby improve reading accuracy of the indicia 82.

In operation, the station indicator assembly 60 displays one of the indicia 82 on the wheel 74 which corresponds to the specific one of the tooling stations 22 which formed the finish on the vial 20 which is adjacent a reference location as it exits the machine 10 on the article conveyor 52. In view of the previous description of the machine 10, it should be appreciated that the particular tooling station 22 which formed a finish on a particular vial 20 is disposed on the conveyor assembly 24 most distant the article conveyor 52 upon which the particular vial 20 exits the machine 10.

In order to function properly, both the speed of rotation of the indicator wheel 74 and its phase must be proper. Given the common drive of the tooling stations 22 and the station indicator wheel 74, they will rotate in a relationship which may be characterized as proportional. If each of the tooling stations 22 cooperates with every one of the revolving fixtures 12 and the indicator wheel 74 includes one each of the indicia 82 corresponding to the tooling stations 22, this rotational relationship should be 1:1, i.e., the tooling stations 22 should complete one circuit around the conveyor assembly 24 as the indicator wheel 74 completes one revolution. Clearly, the components of the drives to one or the other or both of the tooling stations 22 or indicator wheel 74 may be adjusted to achieve this desired relationship. If two sets of the indicia 82 are disposed about the periphery of the indicator wheel 74, its drive speed should be reduced to one-half of that described in the example above by appropriate changes in the diameters of the sprockets 62, 66, 68 and 72. Similarly, changes in the relative drive ratio between the indicator wheel 74 and the tooling stations 22 may be selected to accommodate various tooling cycle schemes and the indicia 82 may be disposed about the periphery of the indicator wheel 74 out of numeric, alphabetic or other order, but in an order which corresponds, when rotated or otherwise sequentially displayed, to the order to utilization of the tooling stations 22 and the order to articles formed thereby and exiting therefrom.

The phase of the indicator wheel 74, i.e., that relative relationship between the indicia 82 displayed through the viewing window 86 and the identity of the tooling station 22 which formed a specific article, e.g., the glass vial 20, which is generally positioned at a reference location, such as adjacent the station indicator 74 on the conveyor 52, is also critical. This phase relationship is a function of the time elapsed between the departure of the article from the particular tooling station 22, to its arrival at the reference location on its exit path, i.e., the article conveyor 52 from the machine 10. This time, of course, includes the time which elapses as the bottom of the vial 20 is formed and the fixtures 12 of the machine 10 revolve approximately 180°. Since the mechanical drives to the revolving fixtures 12 on the machine 10, the tooling stations 22 on the conveyor assembly 24 and the station indicator assembly 60 are common and proportional, the position of one of the lower chuck assemblies 16 which is carrying and is about to discharge a glass vial 20 having a finish tooled in one of the forming stations 22, is positively ascertainable. Therefore, the significant variable is the time taken by the article to move radially outwardly on the article conveyor 52 to the reference location. The phase of the indicator wheel 74 is perhaps most easily adjusted by the use of a tracer vial 20 which is released from a known tooling station 22; the indicator wheel 74 then being manually adjusted to indicate the corresponding indicia 82 as the vial or other fabricated article passes a reference location, preferably the indicator wheel 74 itself, as it exits the machine 10. So adjusted, the station indicator 74 will accurately display the number of the particular tooling station 22 which has tooled or fabricated a given article, and thus greatly simplify the tracing of a malfunctioning tooling station 22 by immediately providing visual identification of the responsible tooling station 22 as a defective or improperly formed article exits the manufacturing device. It should be apparent to those skilled in the art that the indicator of the instant invention has wide application to machines wherein discharge of articles therefrom is at any location remote and visually isolated from the particular forming or fabricating machine station which produced it.

The foregoing disclosure is the best mode devised by the plural inventors for practicing this invention. It is apparent, however, that devices incorporating modifications and variations to the instant invention will be obvious to one skilled in the art of fabricating machines. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A method of identifying articles tooled by one of a plurality of tooling stations of a machine which tooling stations move in a closed path, a part of the path being adjacent to holding fixtures that move around the periphery of the machine, the method comprising the steps of providing a machine having a plurality of holding fixtures, each fixture holding and constraining one of said articles, a plurality of tooling stations, means for displaying indicia, drive means for moving the tooling stations around the periphery of the machine and for moving the holding fixtures into position to tool said articles, with the drive means being constructed and arranged such that each displayable indicia corresponds to the appropriate tooling station and holding fixture, a discharge conveyor for moving said tooled articles away from said machine and means for displaying indicia including a plurality of displayable indicia corresponding to each of such plurality of tooling stations, positioning one of said articles in one of said holding fixtures, moving said one of said plurality of fixtures and said one of said articles into proximity with one of said tooling stations, tooling said one article on one of said tooling stations of said machine, moving the article away from the tooling station after tooling the article, releasing said one article from said one of said holding fixtures and supplying it to said discharge conveyor, moving said one article along said discharge conveyor and past a reference location, displaying the one of the displayable indicia corresponding to said one of said tooling stations, when said one of said articles is generally proximate said reference location.

2. The method of claim 1 wherein said tooling stations and said means for displaying indicia operate synchronously.

3. The method of claim 1 wherein said tooling stations and said means for displaying indicia are driven by a common drive mechanism.

4. A method of determining the identity of a tooling station on which a particular article was formed in a plural tooling station machine, the method comprising the steps of:

disposing one of said articles in one of a plurality of fixtures, each fixture holding and constraining one of said articles and each fixture traveling around the periphery of the machine, moving one of said plurality of fixtures and one of said articles into proximity with one of a plurality of tooling stations that move in a closed path, a part of the path being adjacent to the travel path of the fixtures, tooling said one of said articles on said one of said plurality of tooling stations,
moving the article away from the tooling station after tooling the article,
discharging said one of said articles from said one of said plurality of fixtures,
translating said one of said plurality of articles away from said machine and moving the article along a discharge chute and past a reference location,
displaying from means for displaying indica an indicia corresponding to said one of a plurality of tooling stations as said one of said articles translates past said reference location, said means for displaying indicia being driven to display each indicia by the same drive means which also drives the fixtures and the tooling stations.

5. The method of claim 4 wherein such reference location is distinct from the situs of discharge of said one of said plurality of articles from said one of said plurality of forming stations.

* * * * *